United States Patent [19]
Perkins et al.

[11] 3,948,441
[45] Apr. 6, 1976

[54] TIME VARIABLE THERMOSTAT

[75] Inventors: Charles H. Perkins, Newtown Square; Richard K. Nurnberg, Norristown, both of Pa.; Carl J. Goodhouse, Litchfield, Conn.

[73] Assignee: Robertshaw Controls Company, Richmond, Va.

[22] Filed: Aug. 13, 1974

[21] Appl. No.: 497,151

[52] U.S. Cl............... 236/46 R; 236/47; 307/66
[51] Int. Cl.²............... G05D 23/00; F23N 5/20
[58] Field of Search........ 236/46, 47; 337/302, 303; 307/66

[56] References Cited
UNITED STATES PATENTS

| | | | |
|---|---|---|---|
| 1,985,986 | 1/1935 | Hall | 236/46 X |
| 2,290,757 | 7/1942 | Lawler | 236/46 E |
| 3,136,115 | 6/1964 | Calabrese | 307/66 X |
| 3,214,670 | 10/1965 | Schaf | 307/66 X |

*Primary Examiner*—William E. Wayner
*Attorney, Agent, or Firm*—Harold W. Adams

[57] ABSTRACT

A self-powered set-back electrical thermostatic device for use in a control circuit of a temperature control system requiring no additional wiring that includes a battery powered, motor driven timing mechanism for changing the ambient temperature setting of a thermostat at selected times.

6 Claims, 5 Drawing Figures

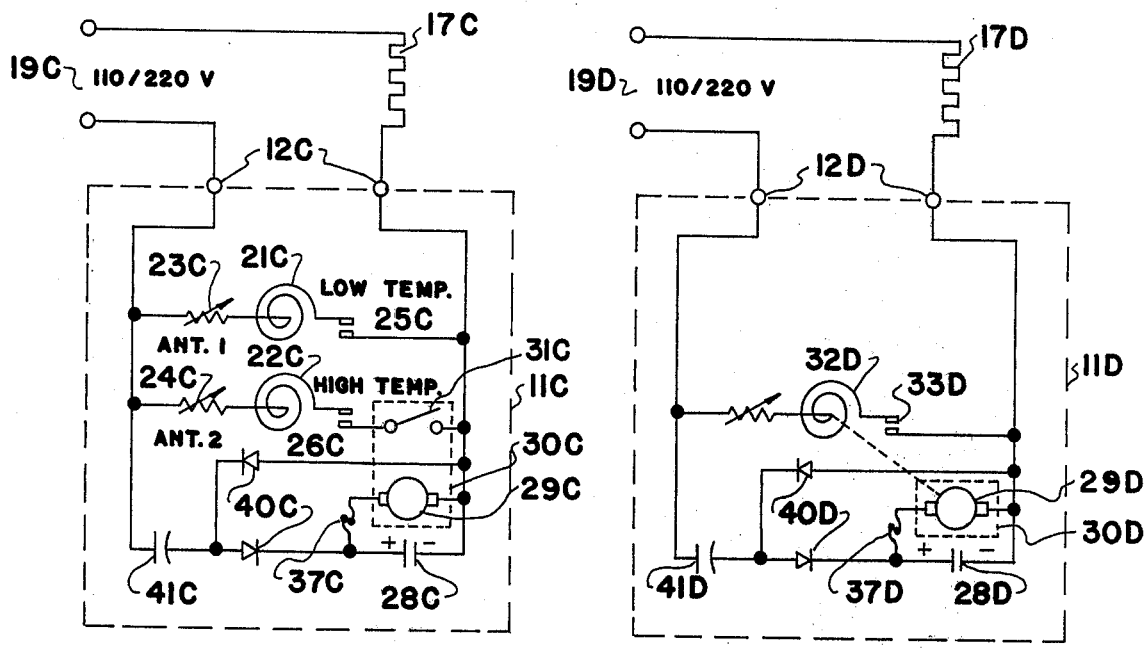
FIG-3
FIG-4
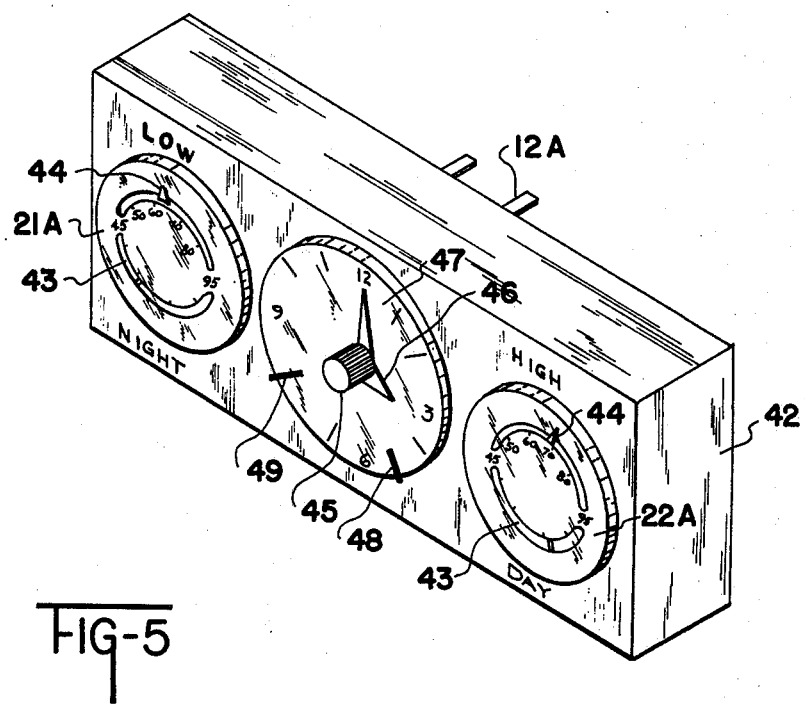
FIG-5

TIME VARIABLE THERMOSTAT

BACKGROUND OF THE INVENTION

Electrical thermostats including means for changing the ambient temperature setting of the thermostat at selected times are broadly known. Typically, in a heating system for instance, such thermostats are employed to set the temperature setting of the thermostat back at night and then the following morning restore it to the previous day setting as an energy saving measure. Such action is applicable in cooling systems as well and in general is taken at the time of maximum change of activity in the room in which the temperature is to be regulated.

Available thermostats responsive to the ambient temperature are usually installed in either a low voltage or a line or high voltage two wire control circuit of the heater, furnace or air conditioner as the case may be. The thermostat includes a switch that remains closed until the selected temperature is reached.

Although setpoint changing devices using conventional electrical thermostats just described are known, all, to the inventor's knowledge, require an additional electrical circuit to power the timing mechanism that determines the day and night change in temperature setting of the thermostat. The cost and need for installing an additional electric circuit for conventional setpoint changing thermostats are believed to be serious and detrimental factors that have discouraged if not depressed the replacement market for such energy saving controls. Also, since such devices are dependent upon line voltage or house current for operation they are subject to power failure requiring the timing mechanism to be reset after line voltage is restored.

SUMMARY OF THE INVENTION

The aforementioned disadvantages of prior art devices are overcome by a preferred embodiment of this invention which includes a battery-powered timing mechanism for changing the ambient temperature of electrical thermostatic means at selected times. Because the invention includes a battery it is self-powered and may be directly installed without additional wiring in the conventional two wire control circuit of the heating or cooling system.

Since the timing mechanism of the thermostat is independent of the two wire control circuit voltage it is not affected by the operation of a limit control or by power failure for all practical purposes and need not be reset when power is restored. Means may also be provided to recharge the battery during periods when the thermostat is satisfied and its switch contacts open.

Although a preferred embodiment of the invention will be described for controlling a heating system, it is understood the invention can be employed in an air conditioning system as well.

BRIEF DESCRIPTION OF DRAWING

FIG. 3 is an electrical schematic illustrating an alternative battery charging circuit when the two thermostat embodiments of FIG. 1 is connected in a circuit directly with a heating element to be controlled:

FIG. 4 is an electrical schematic of the single thermostat embodiment of FIG. 2 connected directly in line with a heater to be controlled; and FIG. 5 is a perspective view of the embodiments of the invention shown in FIGS. 1, 2, 3 and 4 assembled in a housing ready for installation;

DESCRIPTION OF PREFERRED EMBODIMENT A

Figure 1:
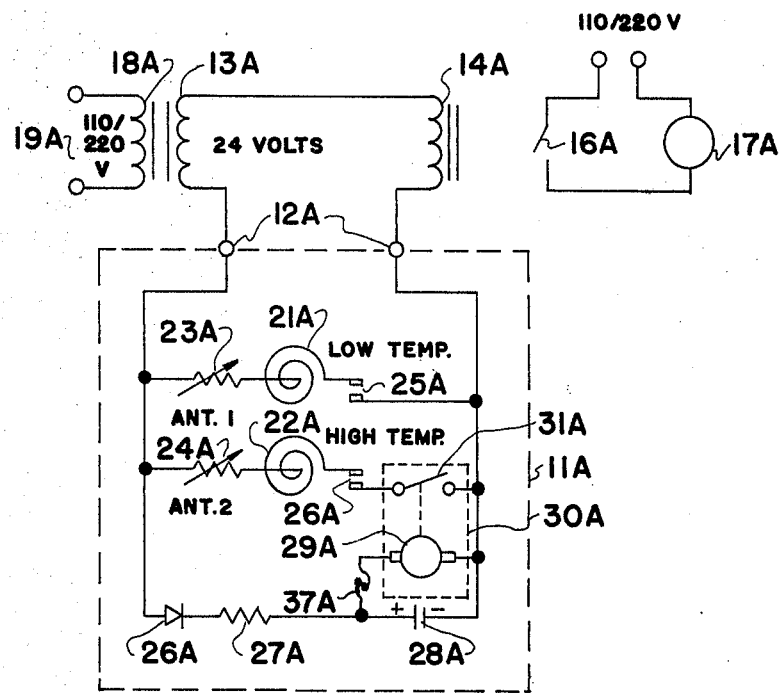
FIG. 1 is an electrical schematic of a preferred embodiment of the invention including two thermostats and a battery-powered timer for switching one of said thermostats in a low voltage control circuit.

FIG. 1 is an electrical schematic of a preferred embodiment of the invention shown in the dashed line enclosure and designated by reference numeral 11A. The thermostatic device 11A is shown connected into a typical two wire low voltage alternating current furnace or heater control circuit at terminals 12A. The two wire control circuit includes secondary winding 13A of a step down transformer and a heating solenoid or relay 14A for operating a switch 16A to turn the furnace 17A on or off as called for by the remotely mounted thermostat 11A. Switch 16A could also be a heat motor or gas operated valve. Primary winding 18A of the step down transformer is connected to a 110 or 220 volt alternating current voltage supply 19A.

The thermostatic device 11A comprises identical or twin, parallel connected ambient temperature responsive bimetal thermostats 21A and 22A designated as Low and High respectively for use in the heating control system and High and Low respectively when the thermostatic device 11A is used in a cooling system. Thermostats 21A and 22A include variable resistors 23A and 24A and switches 25A and 26A respectively.

Thermostats 21A and 22A close their switches in a known manner when that particular thermostat calls for heat to satisfy its temperature setting. Resistors 23A and 25A may be adjusted to anticipate a rising temperature causing the thermostats 21A and 22A to open and to prevent over shooting of the set point as is well known.

Each thermostat 21A and 22A may be provided with mechanical means such as a rotary cam (FIG. 5) to selectively vary the temperature set point of the bimetal throughout the temperature range of the thermostat. Typically in residential thermostats this range may be from 45° to 95°F. A commercially available thermostat that operates satisfactorily is the model TH 200 thermostat manufactured by the Grayson Division, Robertshaw Controls Company, 100 West Victoria Street, Long Beach, Calif.

Thermostats 21A and 22A are in turn each parallel connected with a series of a diode 26A which acts as a half wave rectifier, charging resistor 27A and battery 28A connected to and which powers motor 29A of a conventional motor driven twenty four hour clock timer 30A shown enclosed in broken lines. Either a mechanical type escapement or crystal controlled timing means may be employed as is well known. Motor 29A is mechanically coupled as by a cam to open and close switch 31A in timer 30A at selected times. Switch 31A is connected in series with contacts 26A of thermostat 22A.

Motor driven, battery powered timers 30A of the type described are well known and may be arranged to operate on a 12, 24 or other hourly cycle. For a long cell life any timer having an electrical motor with a starting voltage less than the battery or cell voltage, say for example under 1.1 volts, a peak current under 50 ma and an average current less than 0.4 ma will operate satisfactorily. Nickle-Cadmium rechargeable cells having sufficient ma drain and ma hours capacity are commercially available to power such a timer motor. For instance, the Model 532 AN, motor driven clock timer manufactured by JECO of Japan operates satisfactorily for this purpose.

The duty cycle or ratio of time on and off of a heating or cooling system is variable and since the recharging duty cycle of the cell must restore the charge on the cell during periods when the furnace is off, it too may need to be varied. For instance, assuming contacts 25A and 26A are closed and the furnace 17A is on 75% of the time current calculations in an operative embodiment of the invention may be as follows:

| | |
|---|---|
| Average motor current | 0.176 ma |
| cell self discharge loss | 0.15 ma |
| total cell drain | 0.33 ma |
| recharging rate (mfr. rec.) | 0.46 ma |
| recharging duty cycle 1.4 | 1.84 ma (break even) |

In the worst possible and most unlikely condition where heat is called for 100% of the time, the cell 28A is sufficient to power the timer 30A several days. Also, since the timer 30A is independent of any power source other than the cell, it need not be reset after a power failure in the control circuit lasting several days which itself is highly unlikely.

Normally closed spring contacts 37A are provided so the motor circuit can be opened as by means of an insulating strip. This is a useful cell saving feature when shipping or storing the thermostatic device or over long periods of non use. Nonrechargeable, throw away batteries may be used to power the timer but would have to be replaced more frequently.

ALTERNATIVE EMBODIMENT B

Figure 2:
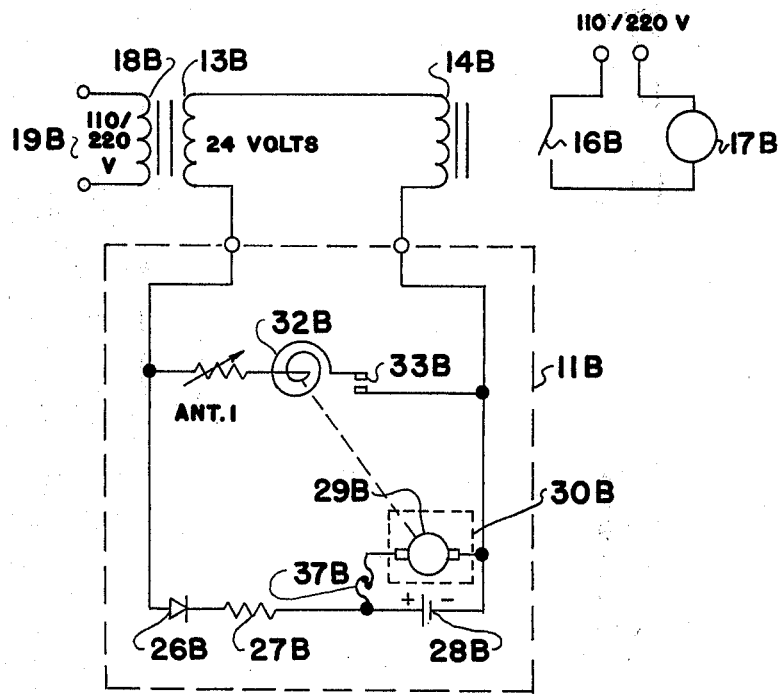
FIG. 2 is an electrical schematic of an alternative embodiment of the invention including a single thermostat.

As shown in FIG. 2 alternative embodiment B may include a single bimetal thermostat 32B, having contacts 33B rather than twin thermostats as in FIG. 1. Like elements described in FIG. 1 are numbered the same with a suffix B.

In this arrangement timer motor 29B mechanically changes the set point (as by a rotary cam) of bimetal thermostat 32B (same as thermostats 21A and 22A) at the time selected. The remaining elements and the operation of the circuit is the same as in FIG. 1.

ALTERNATIVE EMBODIMENT C

As shown in FIG. 3 thermostatic device 11C may be connected directly in line with an electric heater 17C for instance requiring line voltage 19C. Thermostatic device 11C is the same as 11A except that because of the higher line voltage 19C it is necessary to provide the modified battery charging circuit shown as including two diodes 40C which serve to charge and discharge capacitor 41C. The capacitor 41C drops line voltage 19C to avoid internal heating that could affect the set points of thermostats 21C and 22C and to provide adequate charging voltage for cell 28C when contacts 25C and 26C are open. Diodes 40C block any current flow out of battery 28C except through timer motor 29C. The operation of thermostatic device 11C is the same as 11A.

ALTERNATIVE EMBODIMENT D

FIG. 4 illustrates the single thermostat embodiment B when modified as in embodiment C for use in a line voltage circuit. Diodes 40D and capacitor 41D function as in FIG. 3 and the operation of thermostatic device 11D is the same as 11C. In all of the embodiments 11B, C and D throw away batteries may be used.

As shown in FIG. 5 thermostatic devices 11A, B, C and D may each be assembled in a standard housing 42 in the same fashion. As representatively shown housing 42 has openings in the front panel for exposing thermostats 21A and 22A and the clock face of switching timer 30 of thermostatic device 11A. Terminals 12A are accesible at the rear of housing 42 for connection into a two wire low voltage furnace control circuit in the wall where the housing is to be mounted. Thermostats 21A and 22A each include suitable actual temperature display means 43 and an adjustable lever 44 for turning a cam to selectively set the temperature set point over its temperature range.

As shown thermostat 21A is set for the Low or Night setting while thermostat 22A is set for the High or Day setting.

Timer 30A includes a center button 45 for setting hands 46 of clock 47 to the actual time. Adjustable levers 48 and 49 are provided for setting the Day and Night closing and opening times of switch 31A by motor 29A.

When the thermostatic device 11A is employed in a heating system as a night set back control where it is desired to reduce the normal daytime ambient temperature at the thermostat from say 70°F at 8:00 p.m. to a 60°F nighttime temperature and then back to 70°F at 6:00 a.m. the next morning the temperature set point adjustment levers 33 of thermostats 21A and 22A are set accordingly. The clock 47 is set at the actual real time and the adjustable Day and Night levers 48 and 49 set at 6:00 a.m. and 8:00 p.m. respectively.

Assuming it is between 6:00 a.m. and 8:00 p.m. motor 29A is arranged to hold switch 31A closed. Thermostat 22A now dominates thermostat 21A at all times since the ambient temperature is above the setting of thermostat 21A and contacts 25A remain open. Contacts 26A are closed only when heat is required to satisfy thermostat 22A. Motor 29A powered by battery 28A drives timer 30A with contacts 26A open and thermostat 22A satisfied. In this condition diode 26A acts as a half wave rectifier charging battery 28A thru charging resistor 27A. Nearly the entire voltage in the furnace control circuit is dropped across the thermostatic device 11A. There is then insufficient voltage across heating solenoid or relay 14A to close switch 16A and the furnace 17A therefore is turned off.

When the ambient temperature at the thermostatic device 11A drops below the setting of thermostat 22A contacts 26A close to call for heat. Diode 26A blocks the voltage in control circuit and there is no charge to the battery. Current continues to flow from the battery 28A to the motor 29A. The voltage drop across variable resistor 24A is very small leaving sufficient voltage across the heating solenoid or relay 14A to close switch 16A and turn on the heater or furnace 17A. Thermostat 22A dominates thermostat 21A until 8:00 p.m. when the cam driven by motor 29A opens switch 31A permitting thermostat 21A to similarly control the operation of the heater or furnace 17A.

At 6:00 a.m. motor 29A closes switch 31A and thermostat 22A is restored to control. In either the Day or Night mode of operation battery 28A will continue to power motor 29A of timer 30A even with a failure in line voltage 19A. When the line voltage 19A is restored it is not necessary to reset the timer 30A. Normally closed spring contacts 37A may be opened and motor 29A disconnected from the battery 28A by inserting an insulating leaf between contacts 37A. In embodiments 11B and 11D timer motors 29B and 29D respectively mechanically change the set points thermostats 32B and 32D at the selected times. Otherwise the operation of all embodiments is the same.

Although preferred embodiments of the invention have been described in detail the invention is to be limited only by the scope of the appended claims.

What is claimed is:

1. A unitary electrical time variable set point thermostatic device adapted for use in a two wire control circuit of a heating or cooling system without additional wiring comprising:
   a. thermostatic control means having temperature set points and responsive to ambient temperature for opening and closing a thermostatic switch therein, said switch energizing said control circuit to operate said heating or cooling system when said ambient temperature varies a determined amount from said set point;
   b. electric timer means for cyclically changing said set point of said thermostatic means from an initial value at a selected time to a second value and at a selected time thereafter restoring said set point to said initial value;
   c. electrical energy storage means for continuously energizing said timer means independent of said two wire control circuit, said electrical energy storage means comprising a battery connected to said electric timer means; and
   d. means connected in said control circuit for charging said battery during periods when said switch of said thermostatic control means is open.

2. A device as defined in claim 1 wherein said electric timer means includes an electric motor connected to said thermostatic control means for mechanically changing said set point of said thermostatic control means at said selected times.

3. A device as defined in claim 1 wherein said charging means comprises:
   a. a diode; and
   b. a charging resistor series connected with said diode and said battery, said diode blocking current flow from said battery except through said motor when said switch of said thermostatic control means is closed.

4. A device as defined in claim 1 wherein said thermostatic control means comprises:
   a. two thermostatic control means responsive to ambient temperatures, each of said thermostatic control means including a switch connected in said control circuit and responsive to and having an ambient temperature set point, one being higher than the other, each of said thermostatic control means opening its switch to turn off said heating or cooling system when said ambient temperature is above or below its respective set point, that thermostatic control means having the highest ambient temperature set point in either a heating or cooling system dominating the other; and
   b. switch means in said timer means connected in series with said switch of said thermostatic control means having said highest ambient temperature set point, said motor arranged to open and close said switch selected times.

5. A device as defined in claim 1 electrically connected in series with a heating element in a line voltage control circuit.

6. A device as defined in claim 5 wherein said battery recharging means includes:
   a. full wave alternatinv current voltage rectifier means; and
   b. capacitor means series connected with said rectifier means for fixing the voltage in said control circuit appearing across said rectifier means.

* * * * *

Disclaimer 3,948,441.—*Charles H. Perkins*, Newton Square; *Richard K. Nurnberg*, Norristown, both of Pa.; *Carl J. Goodhouse*, Litchfield, Conn. TIME VARIABLE THERMOSTAT. Patent dated Apr. 6, 1976. Disclaimer filed Mar. 11, 1985, by the assignee, *Robertshaw Controls Co.*

Hereby enters this disclaimer to claim 4 of said patent.

[*Official Gazette April 30, 1985.*]